INVENTORS
EBERHARD AUER
WALTER DIETRICH
CHRISTIAN ORTMANN

ATTORNEY

United States Patent Office 3,522,438
Patented Aug. 4, 1970

3,522,438
OPTICAL SCANNING DEVICE HAVING PLURAL ILLUMINATING DEVICES AND A LIGHT SINK FOR EACH SUCH DEVICE TO REDUCE THE EFFECT OF THE DEVICES WHICH ARE NOT INSTANTANEOUSLY IN USE
Eberhard Auer, Stuttgart-Nord, Walter Dietrich, Pforzheim, and Christian Ortmann, Marbach, Germany, assignors to International Standard Electric Corporation, New York, N.Y., a corporation of Delaware
Filed Oct. 23, 1968, Ser. No. 769,787
Claims priority, application Germany, Oct. 28, 1967, 1,549,904
Int. Cl. G01n 21/30; G06m 7/00; H01j 39/12
U.S. Cl. 250—219                                          10 Claims

ABSTRACT OF THE DISCLOSURE

An optical scanning device in which the rays of information from the scanning stations are directed to a common transducer. The device is arranged in direction of a voucher feed so that the voucher will always be positioned under one of the scanning stations. At each scanning station there is provided an optical sink to prevent the light of the unused station from effecting the common transducer.

BACKGROUND OF THE INVENTION

The present invention relates to a device for effecting the optical scanning of recording media having two or more printing lines which, in the direction of the printing lines, are led through a scanning station for automatic recognition of the scanned characters. The height of the two lines of print on the respective voucher is not fixed so that the lines to be scanned may be printed on arbitary parts of the respective voucher.

Machines for separation, conveyance, reading, and the sorting of vouchers are known. In text readers in which a complete page is scanned line by line and read, it is customary that the voucher readers process only such types of vouchers on which there is printed one line of text, and at the utmost two lines of text. In addition thereto, the vouchers may be provided with other printed-on informaion which is only to be read by humans and not by the machine. The restriction to one or two lines of text is accepted in connection with the voucher reading, because this is actually sufficient in most applications, such as in financial transactions, and because high speeds in the processing of the vouchers is very important.

Due to the high conveying speed which is used, the voucher is not stopped in order to scan one line after the other, but there are provided two scanning stations which are arranged apart from one another by at least the length of one line of print, or by the length of one voucher and which are capable of height adjusted to the two lines of print to permit during continuous quick movement of the voucher the scanning of one line of print after the other. Appropriately, the two scanning stations are provided with one common evaluating device, and the picture information obtained from both of the scanning stations is imaged at a suitable point in a common plane. The two lines of print are successively offered to the evaluating equipment one at a time in turn.

In one conventional method for effecting the two-line scanning, the picture information is achieved from two optical systems and converters, with one reading electronic device. This requires an alternative switching from the one optical transducer which is provided for the one line of print, to the other optical transducer which is associated with the respective other line of print. This method is suitable as long as only one optical transducer is used per line of print, hence as long as the character information is being scanned purely serially from the voucher.

It is obvious, that the expenditure for the double arrangement of optical transducers and switchover devices becomes greater and more unfavorable.

The present invention provides a device for the scanning of moving recording media in which there are avoided the aforementioned disadvantages and which, in particular, avoids performing a switchover between the two scanning stations.

SUMMARY OF THE INVENTION

An object of the invention is a device for scanning of a moving recording media on which, in two or more lines of print, there are printed mechanically or automatically readable characters the device consisting of two scanning stations which are alternately rendered effective, and the information thereof being evaluated by a common electronic reader.

In the scanning stations, the illuminating arrangements and the optical devices are designed and arranged so that the paths of rays of the information are directed to a common optical or light transducer arrangement, and the scanning devices are arranged in the direction of the voucher feed or transport in a spaced relation so that the voucher will always only be positioned under one of the two scanning stations. Also, in the scanning stations, there is provided an optical sink for effecting the light of the scanning device which is not in use, so that it is applied in a weakened or diffused manner, or not at all, to the light or optical transducer arrangement.

A feature of the invention is that both illuminating arrangements can permanently remain in operation without the one which is not being used causing and disturbing light signals to effect the character recognition.

Another feature is that the optical sink can be provided at the scanning station with the aid of a drum which has dark or blackened grooves, so that the light from the illuminating device will fall into these grooves and only effect the light converters or optical transducers in a weakened and diffused manner. Instead of the groove-type drum it is also possible to employ a disk-type drum, in which the disks are arranged at a certain spaced relation, with the light then disappearing in the interspaces thereof. In many cases it is also appropriate to enploy two disk-type drums gripping into one another to effect the feeding of the vouchers, since this way provides good straight-lined guidance of the voucher at the scanning station.

At the scanning station it is also possible to guide the vouchers by parallel-extending belts, between which the light is absorbed by a dark background. Still another possibility of optical sink is guiding the voucher between two sheets of metal having at the same point a window, the voucher is then illuminated through the one window and scanned, whereas the light in the absence of a voucher, passes through both windows and disappears in a dark background. These two sheets of metal can be arranged so that they can be displaced throughout the entire height of the voucher, thus enabling the lines of print of the voucher to be printed at any arbitary level.

BRIEF DESCRIPTION OF THE DRAWINGS

Further features of the invention can be understood from the following description taken in conjunction with the drawings in which.

DESCRIPTION OF THE PREFERRED EMBODIMENTS

Figure 1:
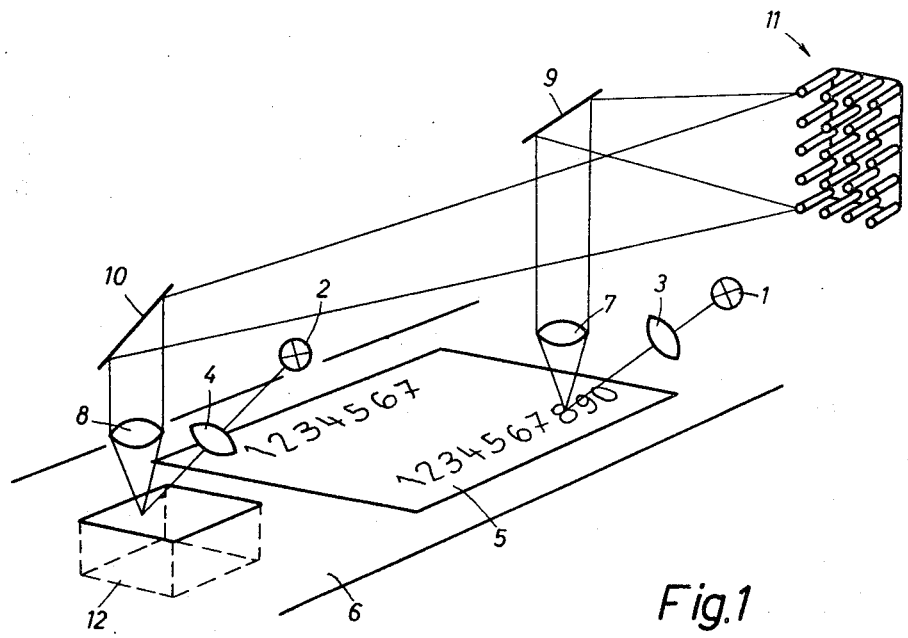
FIG. 1 schematically shows the principle of the two-line scanning with an optical sink according to the invention.

FIG. 1 schematically shows an embodiment of the invention in which all parts are omitted which are not absolutely necessary for understanding the invention. From the paths of rays, it will be recognized that the two illuminating arrangements 1 and 2 illuminate the voucher 5 or, in the absence thereof, the background 6 (guiding sheet) via a lens 3, 4. The light as remitted in a diffused fashion from there, is projected by an objective lens 7, 8, and a mirror 9, 10 to the common light converter or optical transducer arrangement 11 which is shown as a matrix. The output circuits of the light transducer matrix are not shown since many types are well known.

The images of the information (characters, white paper, or background) existing at the two scanning points overlap each other in the plane of the light transducer. If legible characters were at each of the two scanning points, none of them could be properly identified by the reading device. If at the one scanning point there is positioned a character, and a white paper is positioned at the other scanning point then a proper image would result in the plane of the light transducer. However, the image would be considerably brightened, so that the recognition, would be difficult.

In order to avoid this there is provided an optical sink 12 at each scanning station (not shown in the second scanning station). As shown, owing to the optical sink 12, no light is sent back so that in the plane of the light transducer there will result a clear picture from the other scanning station.

If the voucher 5 moves a small distance towards the left, the characters of the other line of the voucher are scanned, and the illuminating device 1 will not be effected, because the second scanning point also has an optical sink.

Figure 2:
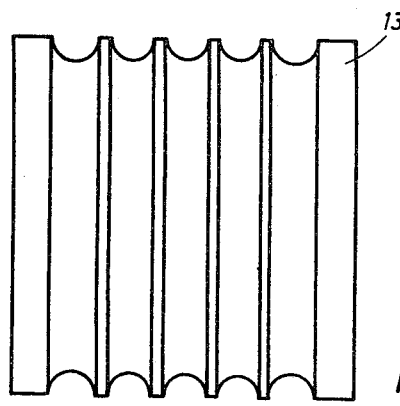
FIG. 2 shows a groove-type drum for guiding the vouchers.

FIG. 2 shows an example of such a type of optical sink. In the case of a groove-type drum 13, the lines of print are not permitted in every position, but only at the points of the grooves. In a further embodiment of the groove-type drum, the grooves are extended down to the axis to form disk-type drums.

In many cases it is not advantageous to lead the voucher past a scanning station by a drum, because the curvature of the drum may cause inaccuracies during the imaging of the characters. It is possible to enlarge the drum diameter, but due to the other arrangements and devices in entire system, this is subject to certain limitations.

Figure 4:
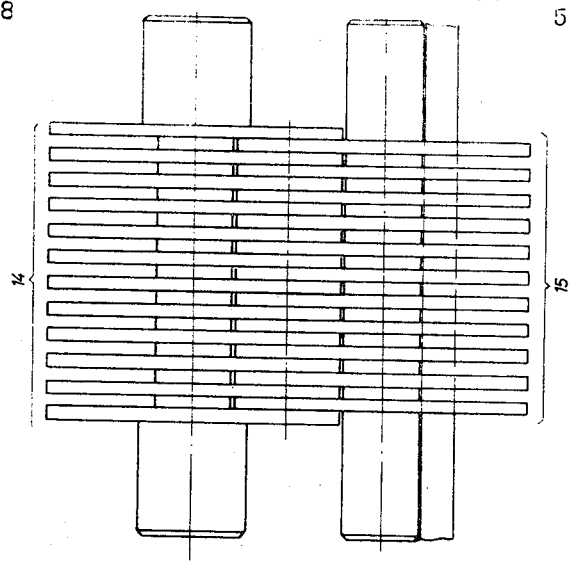
FIG. 4 shows the two disk-type drums in direction of the arrow A in FIG. 3.
Figure 3:
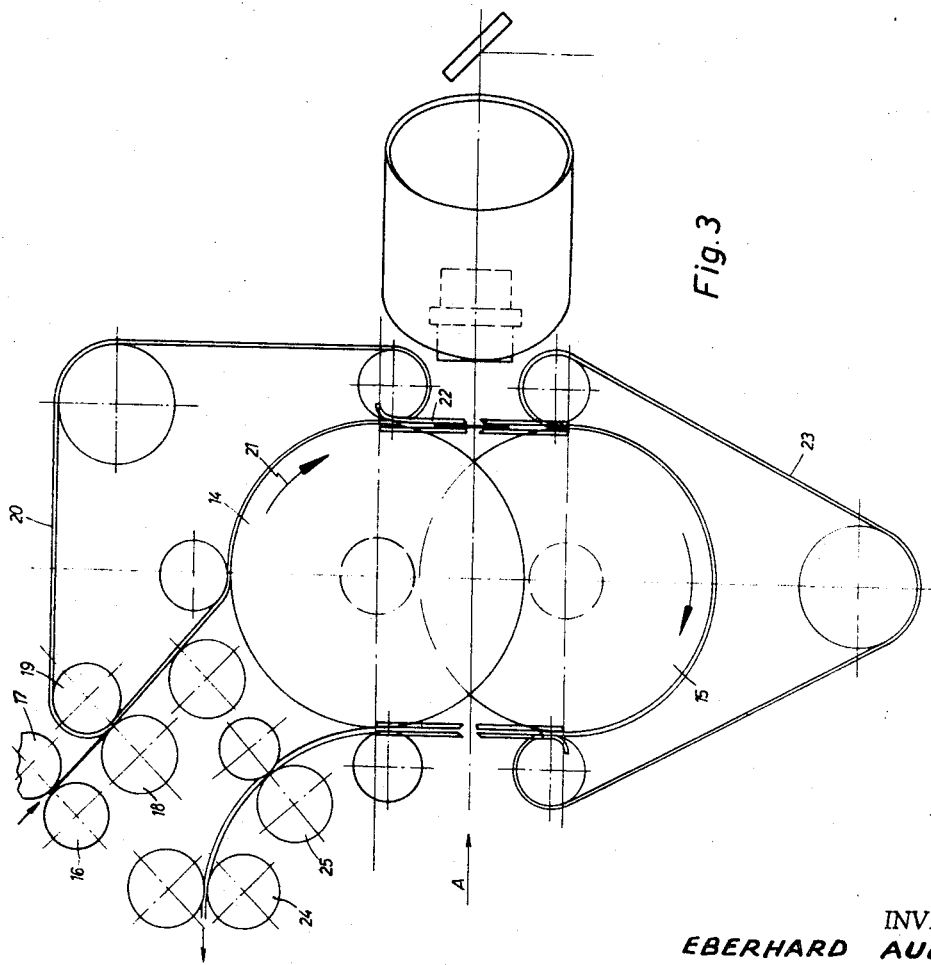
FIG. 3 shows an embodiment consisting of two disk-type drums gripping into one another.

FIG. 3 shows an embodiment of the invention in which the vouchers are led past the two scanning stations by two drum type disks. In this example the optical means are only schematically indicated as shown in FIG. 4, the two drums consist of equidistant disks which are arranged so that the disks extend into one another without causing any frictional drag. The two drums 14 and 15 are arranged behind each other in the feed direction (direction of transport). A flat conveying section which is indicated by the feed rollers 16 and 17 cause the vouchers 5 to enter the range of action of the feed rollers 18 and 19 where they are seized by the endless belt 20 and fed to the upper disk-type drum 14.

This drum 14 continuously rotates at a high speed in the direction indicated by the arrow 21, so that the vouchers are guided between the belt 20 and the surface of the drum. From the drum 14 the vouchers are fed through the diaphragm 22 which is designated so that the vouchers are passed through the scanning station without fluttering. Then the vouchers are seized by the disk-type drum 15 and are fed between the drum surface and the endless belt 23 towards a discharging conveyor section which is schematically represented by the pairs of rollers 24 and 25.

As indicated in FIG. 3, the axes of rotation of the two drums 14 and 15 are close to one another so that both of the drums extend or grip into one another. This is possible because the drums consist of individual disks arranged in a spaced relation so as to slide past one another without friction. It can be seen that the vouchers 5 are fed through the scanning station in a straight fashion with a space being provided behind the vouchers to act as the optical sink.

FIG. 4 shows the two disk-type drums 14 and 15 in a top view.

Figure 5:
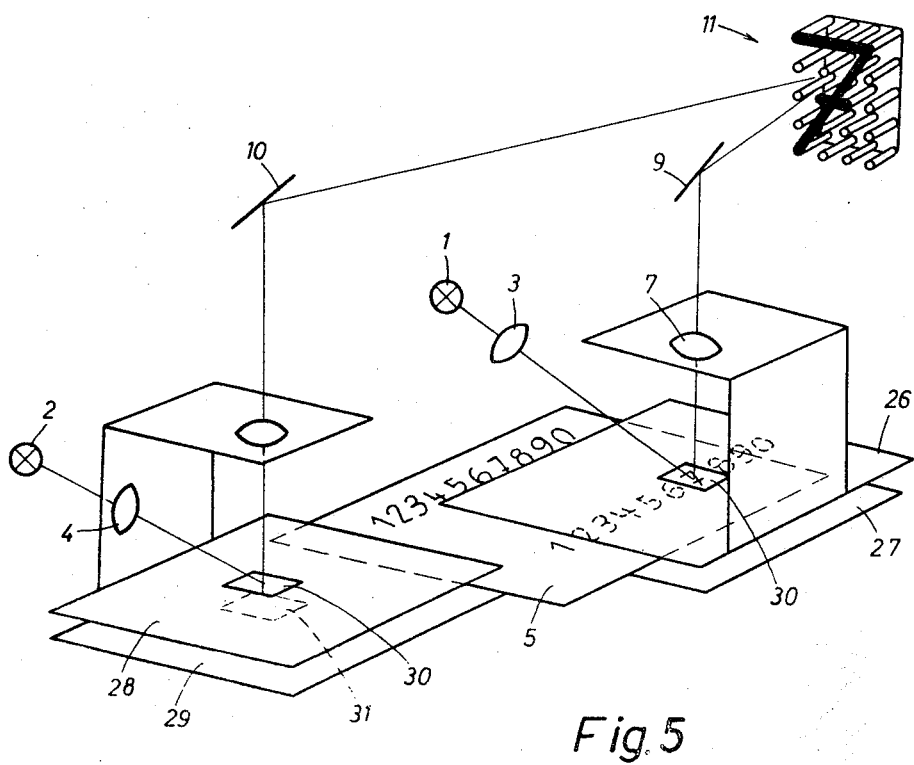
FIG. 5 shows the two-line scanning employing a voucher guide effected with the aid of two sheets of metal capable of being displaced.

FIG. 5 shows an embodiment of the invention which makes it possible to adjust the scanning optics to different levels of height according to the lines of print. Identical parts are indicated by the same reference numerals. The voucher 5 is guided between sheet metals 26 and 27 or 28 and 29 respectively, which are firmly connected to the scanning devices and are capable of being displaced together throughout the entire width or height of the voucher. At each scanning point and in both of these sheets of metal, there is cut-out a window 30, 31 through which, in the absence of a voucher, the light from the illuminating device passes and is absorbed in the dark background. The dark background may be any existing hollow space in the machine, or a blackened sheet metal member.

The arrangement is designed so that the scanning devices can be adjusted to different lines of print with special optical conditions observed. This requires that the character which is imaged in the image plane of the light transducer is sufficiently sharp and in the proper position and not turned or twisted. In the embodiments according to FIGS. 1 to 4, these requirements can be met by the characters being imaged in the plane of the light transducer in a tele-centrical way. This can be performed successively when employing light-spot scanning, but can not be achieved when employing the planar picture transmission. The scanning device is capable of being displaced along the drum axes by a worm drive. This is possible according to FIG. 5 if the scanning device, the entire optical system including the light transducers, are rigidly connected to one another and displaced in common with the aid of a parallel-worm gear drive.

Figure 6:
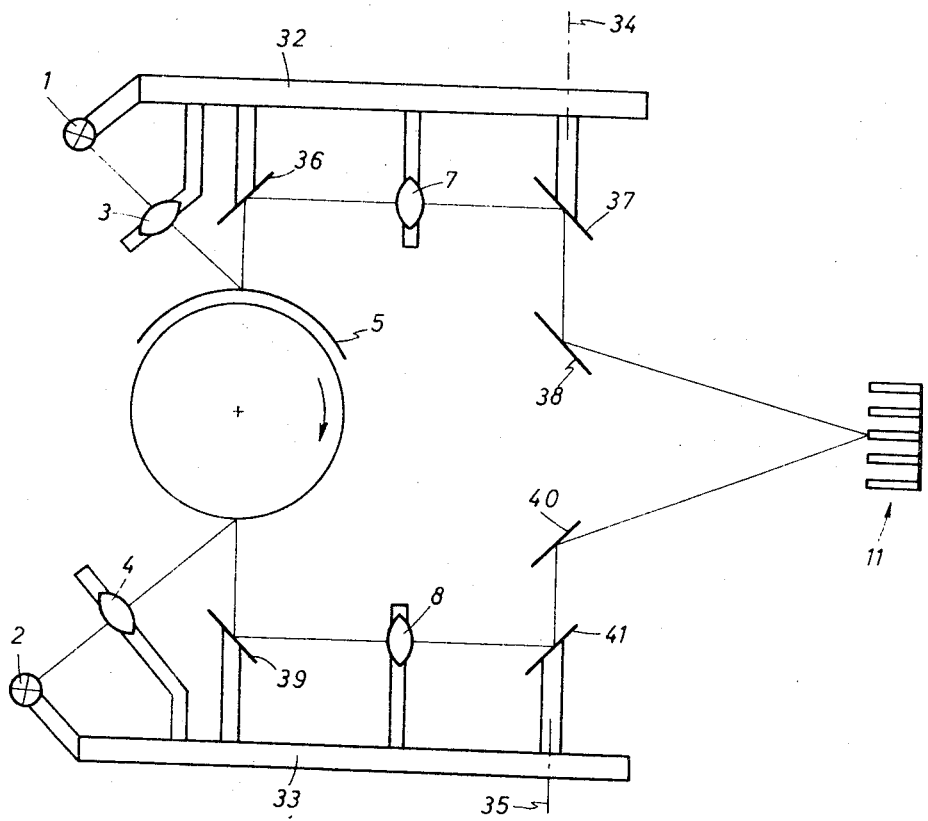
FIG. 6 shows the two-line scanning employing slewable levers for adjusting the scanning station to the level of height of the line of print.

FIG. 6 schematically shows another possibility for meeting the optical requirements resulting from level displacement. Instead of parallel-worm gear drive, there is provided a simple lever 32, 33 which is capable of being swivelled about an axis of rotation 34, 35. The scanning device 1, 3 or 2, 4 mounted to the outer end thereof, can be displaced throughout the entire height of the voucher 5 when the image is projected by the mirrors 36, 37, 38 or 39, 40, 41, on to the light transducer arrangement 11. This arrangement is sufficient where the angle of rotation of the lever is a small one (e.g. about 1°), hence when the relationship between the height of the voucher and the length of the lever is a small one. For symmetry, the axis of rotation of the lever will be placed in the center of the height of the voucher, because the angle of rotation is equal towards both sides. With respect to picture or image transmission, the angle of rotation is important because the turning or twisting of the scanned character in the plane of the light transducer will be as large as the angle of rotation. This arrangement is only useful for a small angle of rotation. This restriction in many cases is reasonable. For example, in cases where the two lines of print are positioned directly above each other on the voucher, as in checks.

However, there are many applications in which the arrangement of the lines of print on the voucher is more variable. Therefore angle of rotation of the lever and the twisting of the character may then become greater than e.g. 1°. Compensating for this angle of rotation will be necessary, because due to the twisting the proper recognition of the characters is endangered.

Figure 7:
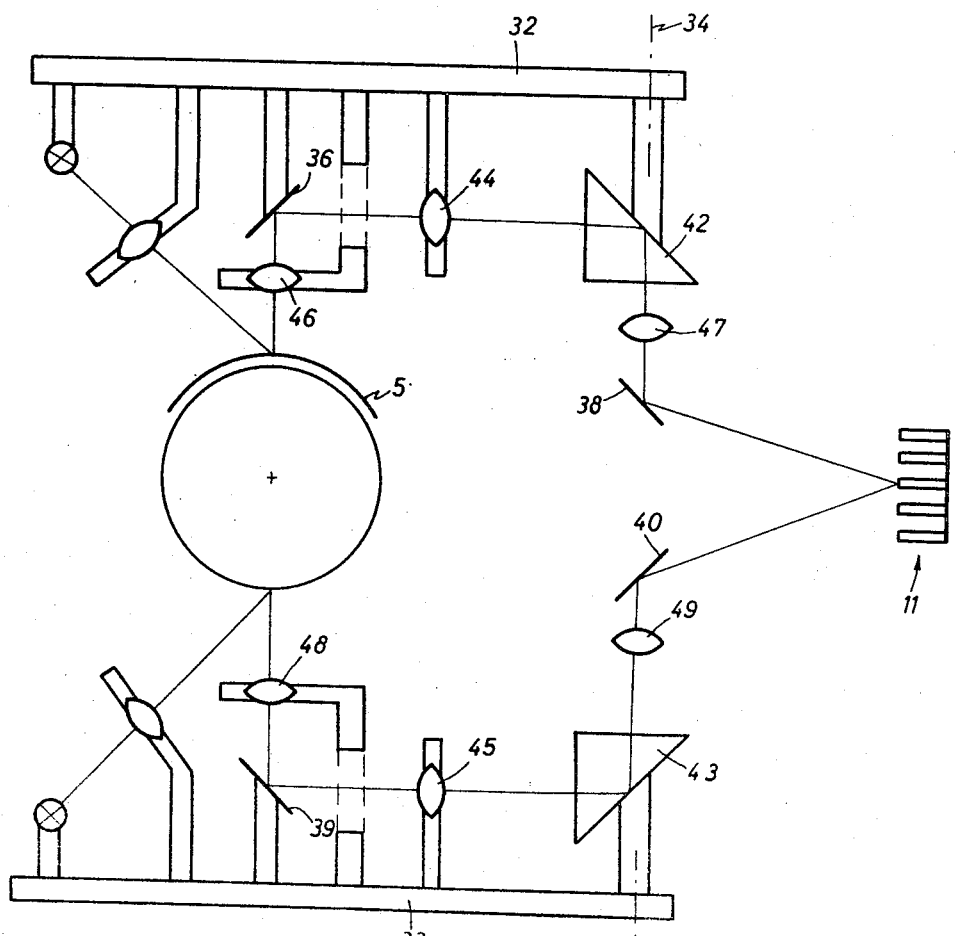
FIG. 7 shows the path of rays in a further embodiment according to the invention.

For this purpose, it is possible to use an arrangement according to FIG. 7 wherein, instead of the mirror 37, 41 there is provided a pentaprism 42, 43 which is mounted in the axis of rotation 34, 35, and is swivelled with the aid of the lever 32 or 33 respectively. This prism eliminates the twisting or tilting of the character for large angles of rotation. If the other optical conditions are observed, namely that the axis of rotation of the prism as well as the emitting light ray are lying in the axis of rotation of the lever, the scanning light beam extending from the voucher to the mirror 36 or 39, is lying parallel in relation to the axis of rotation 34 or 35 respectively.

To improve the path of rays, it is also possible to provide a field lens 44, 45 of a known type. This lens, in the case of a given field of view (range of vision), i.e. the character field plus position tolerances, permits on the voucher a good light yield in the case of compactness of the path of rays. The schematically shown lenses 46 and 47 or 48 and 49 are necessary for imaging the character field on the light transducer arrangement 11 respectively. By the symmetrical construction and the two last-mentioned redirecting mirrors 38 and 40, it is possible to achieve a uniform and small angle for the path of rays with respect to the normal line in relation to the light transducer plane for both scanning stations. This is an advantage of this arrangement which, up to a certain degree, is demanded for achieving a sufficiently sharp image of the character in the light transducer plane. Still more important, however, is that when employing silicon photodiodes with relatively small angles of incidence, linearity is safeguarded for all angles of incidence between the incident light and the output voltage.

We claim:

1. An arrangement for the scanning of moving recording media having two or more lines of print of automatically readable characters, two scanning stations are included in said arrangement which alternately provide the character information to a common electronic reading system, the improvement comprising at least two scanning stations having illuminating devices (1, 2) with associated optical arrangements (3, 7, 9; 4, 8, 10) for forming the image of the character information on a common light transducer arrangement (11), each said station is associated with one line of print and is positioned in the direction of a voucher (5) feed, said stations are arranged in spaced relation to the voucher (5) so that it is always only positioned under one of said two scanning stations, and an optical sink (12) is located behind each scanning station for reducing the effect of the light of the scanning device which is not in use so that it does not interfere with the light transducer arrangement (11).

2. An arrangement according to claim 1, wherein said optical sink (12) is provided by a groove-type drum (13) having dark or blackened grooves which aid in the transporting said voucher (5) past the scanning stations.

3. An arrangement according to claim 1, wherein said optical sink, is provided by a drum consisting of individual disks which aid the transporting of said voucher (5) past the scanning stations.

4. An arrangement according to claim 1, wherein said optical sink (12) is provided two disk-type drums (15, 14) rotating in the same direction, each of said drums consisting of equidistantly arranged coaxial disks, whose axes of rotation, in the feed direction, are arranged at a smaller spaced relation than the diameter of said drums, and said disks of said two drums are arranged in an interlacing manner without causing any friction between the disks.

5. An arrangement according to claim 1 wherein said optical sink is provided by belts on which said vouchers are guided past the scanning point, the belts being parallel-extending belts between which the light disappears into a dark background.

6. An arrangement according to claim 1 wherein for guiding said vouchers at said scanning point there are provided two sheets of metal (26, 27; 28, 29) each having a window (30, 31) for achieving said optical sink.

7. An arrangement according to claim 6 in which said two metal sheets (26, 27; 28, 29) are displaceably arranged mechanically adjustably throughout the entire height of said voucher (5) and to a predetermined line of print.

8. An arrangement according to claim 1 wherein for effecting the optical transmission of the character image from the voucher to the light transducers, the illuminating devices and optical arrangements are both mounted to the end of an associated lever (32, 33) which are capable of being swivelled about an axis, such that by swivelling said lever, the scanning point can be brought into any desired level of height of said voucher, and the length of the path of rays extending from the voucher to the light transducers does not affect the image focusing.

9. An arrangement according to claim 8, wherein the path of rays extends along the mechanical construction of said lever and a pentaprism (42, 43) is provided in each said path to compensate for the turning of the character image on the light transducers (11) as caused by a swivelling of said lever (32, 33), and a field lens (44, 45) is located in each path to obtain the desired section of the character field in the case of a compact optical construction.

10. An arrangement according to claim 9 wherein both said paths of rays and said lever of said two scanning stations are arranged in a symmetrical fashion, and the angle of incidence of said two beams of rays upon said light transducers is small.

References Cited

UNITED STATES PATENTS

| | | | |
|---|---|---|---|
| 3,027,830 | 4/1962 | Yaeger | 250—223 X |
| 3,206,607 | 9/1965 | Vaughan et al. | 250—219 X |

ARCHIE R. BORCHELT, Primary Examiner

T. N. GRIGSBY, Assistant Examiner

U.S. Cl. X.R.

250—220, 223